United States Patent [19]

Fineberg

[11] Patent Number: 4,531,587
[45] Date of Patent: Jul. 30, 1985

[54] DOWNHOLE FLAPPER VALVE

[75] Inventor: Douglas H. Fineberg, Broken Arrow, Okla.

[73] Assignee: Baker Oil Tools, Inc., Orange, Calif.

[21] Appl. No.: 582,482

[22] Filed: Feb. 22, 1984

[51] Int. Cl.³ .................. E21B 34/06; E21B 43/12
[52] U.S. Cl. .................... 166/332; 166/373; 137/527
[58] Field of Search .......... 166/332, 373; 137/527, 137/527.6; 251/303

[56] References Cited

U.S. PATENT DOCUMENTS

| 2,162,578 | 6/1939 | Hacker | 166/332 |
| 4,154,303 | 5/1979 | Fournier | 166/332 |
| 4,433,702 | 2/1984 | Baker | 137/527.6 |
| 4,457,376 | 7/1984 | Carmody et al. | 166/332 |

Primary Examiner—Stephen J. Novosad
Assistant Examiner—Bruce M. Kisliuk
Attorney, Agent, or Firm—Norvell & Associates

[57] ABSTRACT

A flapper valve has integral, oppositely projecting hinge pins mounted in a recess provided between two abutting tubular housing members. The flapper valve is of cylindrical segment configuration so as to maximize the opening within a conduit in which it is mounted when the flapper valve is pivoted to its open position. The spring bias urging the flapper valve to the closed position is provided by helical springs mounted in surrounding relationship to the axis of the conduit and in an annular recess provided between two abutting tubular housing members. The bottom surface of the actuating sleeve for the flapper is contoured so as to exert a minimum unbalanced torque on the flapper valve during opening with the mechanical opening force being balanced by an opposing force exerted by fluid pressure. Such construction permits a substantial reduction in the size of the hinge pins and the space required to mount the pins and the helical springs, thus reducing the radial proportions of the flapper valve assemblage to increase the open bore diameter.

14 Claims, 5 Drawing Figures

DOWNHOLE FLAPPER VALVE

BACKGROUND OF THE INVENTION

1. Field of the Invention

This invention relates to a safety valve for subterranean wells and particularly to a flapper-type safety valve that is mounted in a downhole location.

2. Description of the Prior Art

Safety valves are often employed in subterranean wells. One common safety valve is a flapper-type valve which is pivotally mounted on an axis transverse to the longitudinal axis of the well bore and is spring urged to a horizontal transverse position where it engages a downwardly facing annular valve seating surface to close the well bore. Such flapper valves can then be shifted downwardly by an actuating sleeve to a substantially vertical open position wherein the flapper valve is disposed in a recess provided in the side wall of the particular well conduit or housing in which it is mounted.

To minimize the obstruction enlargement of the conduit required when the flapper valve is open, valves in the configuration of a cylindrical segment have been used, so that in the open position the downstream surfaces of the valve will be disposed adjacent the bore of the conduit, thus enlarging the flow area. See U.S. Pat. Nos. 2,162,575 to Hacker and 2,447,842 to Cameron et al.

Obviously, the smaller the radial projection necessary for mounting the flapper, the greater will be the conduit bore, thus maximizing the production capabilities of the particular conduit and facilitating the insertion of various tools therethrough.

In the normal subterranean oil or gas well, there is generally a substantial upwardly directed force produced on the upstream face of the flapper valve when it is disposed in its closed, transverse position with respect to the bore of the well conduit. The resultant pressure force is essentially centralized in the center of the flapper valve. On the other hand, when the actuating sleeve is driven downwardly into abutting engagement with the upwardly facing or downstream face of the flapper valve, the point of engagement of such actuating sleeve with the flapper valve has heretofore been primarily a matter of chance. To facilitate the opening of the flapper valve, it has been previously proposed, as in said Hacker patent, that the elevated portions of the flapper valve be contacted by the actuating sleeve at a point more radially displaced from the pivot axis of the flapper valve than the resultant of the upward pressure force. While this makes the valve open more readily, it also imposes a substantial torque moment on the valve which must be absorbed by the hinge structure. As a result, hinge pins of fairly substantial diameter have heretofore been employed. The larger the diameter of the hinge pin, the larger the obstruction of that portion of the conduit housing within which the flapper valve is pivotally mounted.

It has also been common to employ conventional torsion springs for urging the flapper valve to its closed position. Such conventional springs generally embody a spring wire member having a plurality of coils wrapped around the hinge pin. Again, this inherently enlarges the required space for mounting the hinging elements of the flapper valve, thus further obstructing the conduit housing.

Minimization of torque applied on the flapper valve hinge pin would permit reduction in the size of the hinge pin. Moreover, the elimination of the necessity for wrapping the coils of a torsion spring around the hinge pin would provide the opportunity for further reduction in the counduit obstruction due to the open flapper valve.

SUMMARY OF THE INVENTION

The invention provides a downhole flapper valve and actuator so constructed that the oppositely directed forces produced by the actuator and the downhole pressure when initially opening the valve are effectively applied at substantially the same radial distance from the hinge pin, thus minimizing any torsional moment being applied to the flapper which must be absorbed by the hinge pin. This permits use of a smaller hinge pin since the stress that it must withstand has been significantly reduced. This invention also provides a flapper valve having a pair of oppositely projecting, co-axial hinge pins integrally formed thereon. In place of the conventional torsion spring, a pair of helical springs are provided which are mounted in an appropriate recess in the housing defining the conduit. Such springs apply a torsional bias to the ends of the integral hinge pins to urge the flapper valve to its closed position.

This combination of structural features reduces the obstruction of the conduit or, in other words, for a given maximum width of the housing containing the flapper valve, a greater conduit bore diameter can be accommodated.

The minimization of the unbalanced torque operating on the flapper valve during its initial movement from a closed to an open position is accomplished by arcuately shaping the downwardly facing surfaces of the actuating sleeve to cooperate with the upwardly facing cylindrical segment surfaces of the flapper valve body so that the effective point of application of the downward force produced by the actuating sleeve has a roughly equivalent moment arm as the resultant upward force produced by the downhole fluid pressure. As the valve pivots to its open position, the points of contact of the actuating member with the flapper valve move inwardly toward the hinge axis and remain roughly equivalent to the moment arm of the resultant upwardly acting fluid pressure force. This means that during the opening of the flapper valve, the resultant moment produced on the flapper valve by the unbalanced actuating forces and fluid pressure forces is minimized and the difference in torque arms is small or non-existant so that the hinge pin experiences a minimum force resulting from the moment or force couple produced by the unbalanced forces.

Further advantages of the invention will be readily apparent to those skilled in the art from the following detailed description, taken in conjunction with the annexed sheets of drawings, on which is shown a preferred embodiment of this invention.

DESCRIPTION OF PREFERRED EMBODIMENT

Figure 1:
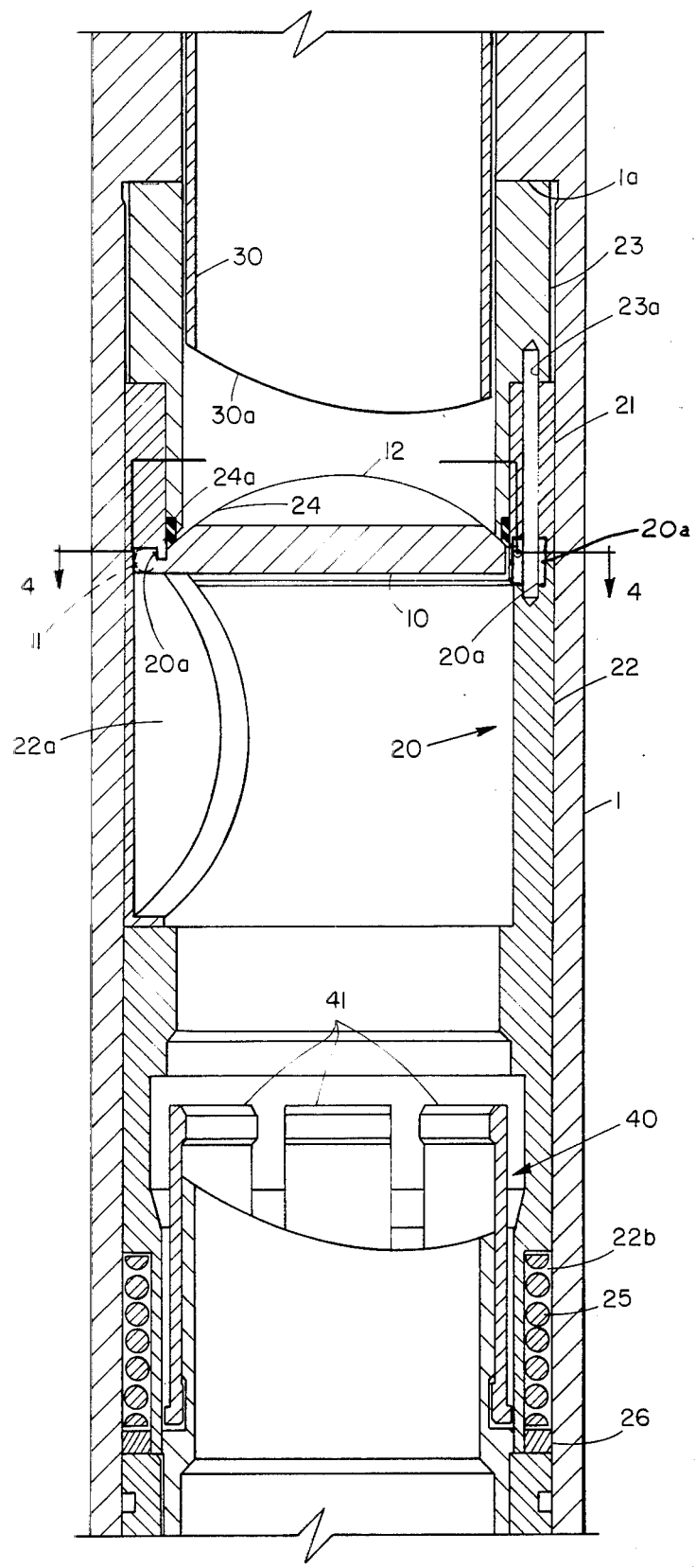
FIG. 1 is a vertical, sectional view of a flapper valve embodying this invention shown in its closed position relative to the well conduit in which it is mounted.

Referring to FIG. 1, a flapper valve assemblage embodying this invention is shown in assembled relationship within a well conduit 1. A flapper 10 is pivotally mounted for movement about a horizontal transverse axis by a pair of oppositely projecting, integral hinge pins 11 which are pivotally secured in an annular recess 20a defined between two axially adjacent tubular members 21 and 22 which cooperate to define a flapper valve housing 20. Locating pins 23a maintain the tubular members 21 and 22 in radial alignment.

Figure 2:
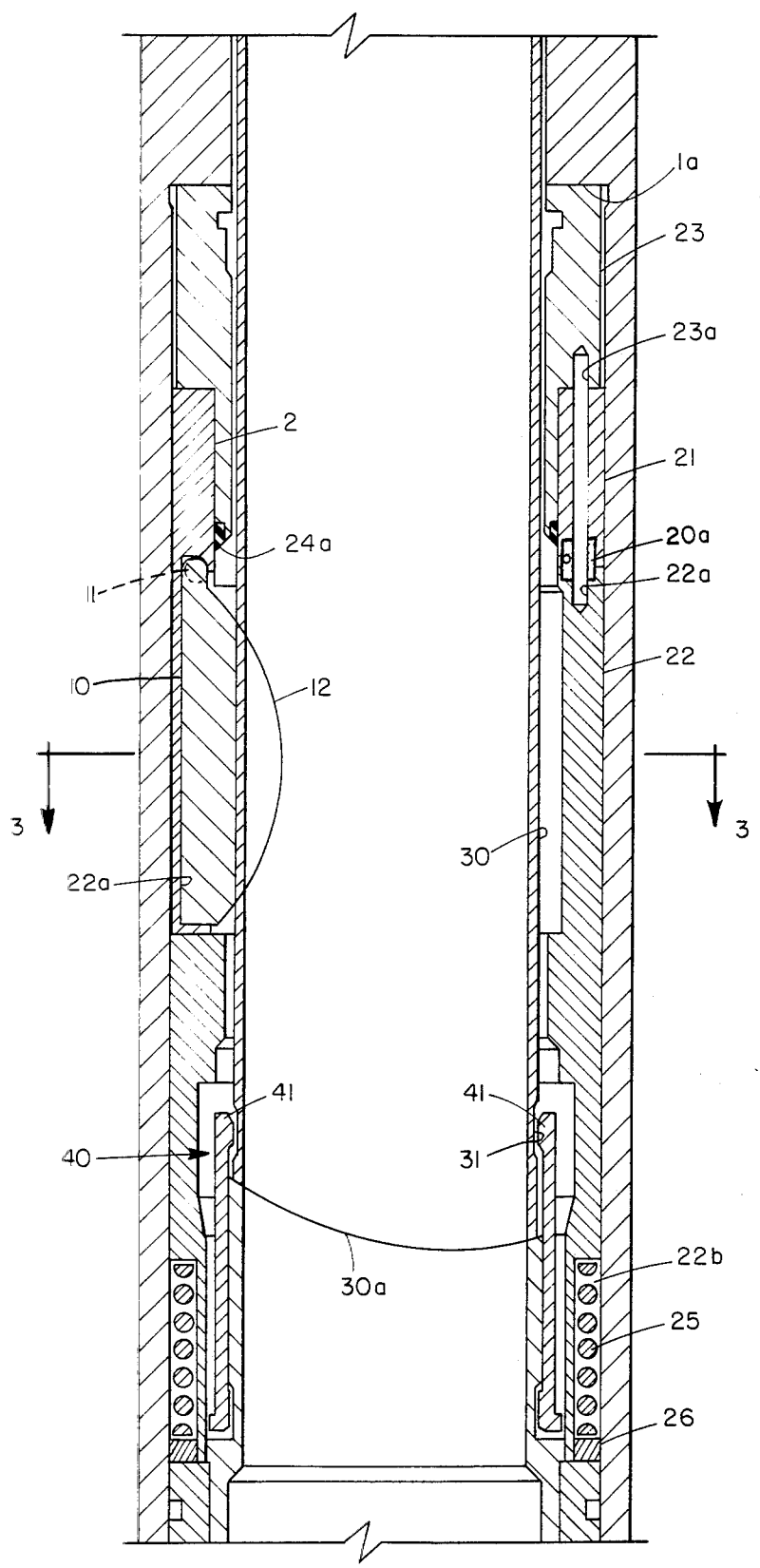
FIG. 2 is a view similar to FIG. 1 but illustrating a flapper valve in its open position relative to the conduit.
Figure 3:
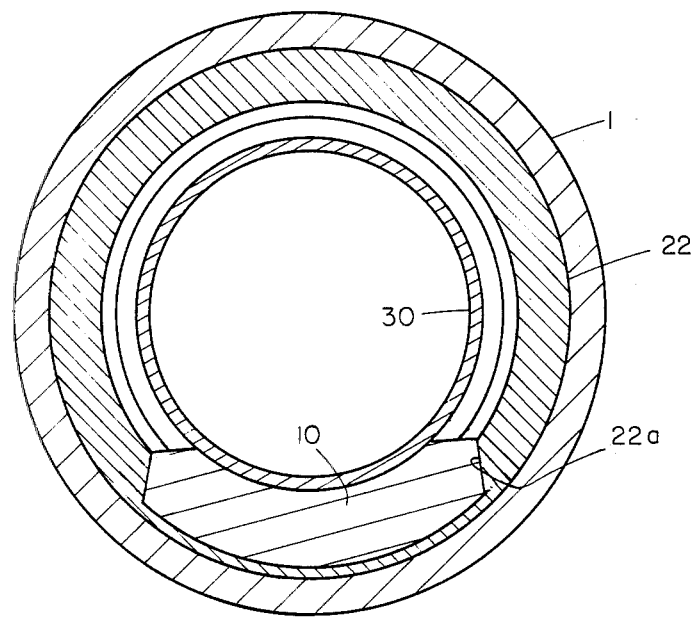
FIG. 3 is a sectional view taken on the plane 3—3 of FIG. 2.

The flapper valve housing 20 further comprises a valve seat sleeve 23 which is mounted in abutting relationship above the tubular elements 21 and 22 and is keyed thereto by the peripherally spaced locating pins 23a. The valve seat sleeve 23 defines at its bottom end an annular, cylindrically shaped sealing surface 24. An elastomeric seal 24a may be inserted in such surface. Sealing surface 24 corresponds to that generated by passing a cylindrical cutting element through the valve seat sleeve 23 along a path perpendicular to the axis of sleeve 23. A corresponding annular, cylindrically shaped seating surface 12 is formed on the flapper 10, which corresponds to the shape of a circular segment cut from an annular cylindrical member by passing a cutting cylinder through the annular cylindrical member along a radial axis perpendicular to the axis of the cylindrical member. As a result, when the flapper 10 is pivoted about hinge pins 11 to its substantially vertical, open position shown in FIG. 2, the internal contour of the flapper 10 will correspond to the cylindrical bore of the valve seat defining sleeve 23, and hence provide unrestricted fluid passage through such bore. A generally circular, radial recess 22a is provided in the side wall of the lower tubular member 22 to receive the main body portion of the flapper valve 10 within such recess when the flapper valve 10 is pivoted to its vertical position as shown in FIG. 2.

The flapper 10 is shifted from its horizontal closed position to its substantially vertical open position by the downward movement of an actuating sleeve 30 which is conventionally mounted in the bore of conduit 1, and is moved downwardly by a conventional fluid pressure actuating device (not shown). For example, the actuating mechanism provided in co-pending application, Ser. No. 280,592 filed July 6, 1981, may be utilized for effecting the operation of the actuating sleeve 30. If desired, a conventional latch mechanism 40 comprising a plurality of latching collet arms 41 may be mounted within the interior of the lower tubular member 22 to engage an annular recess 31 in the actuating sleeve 30 in latching relationship when it is moved downwardly to its valve opening position, as illustrated in FIG. 2. Such latching mechanism is entirely conventional and forms no part of the instant invention.

Figure 4:
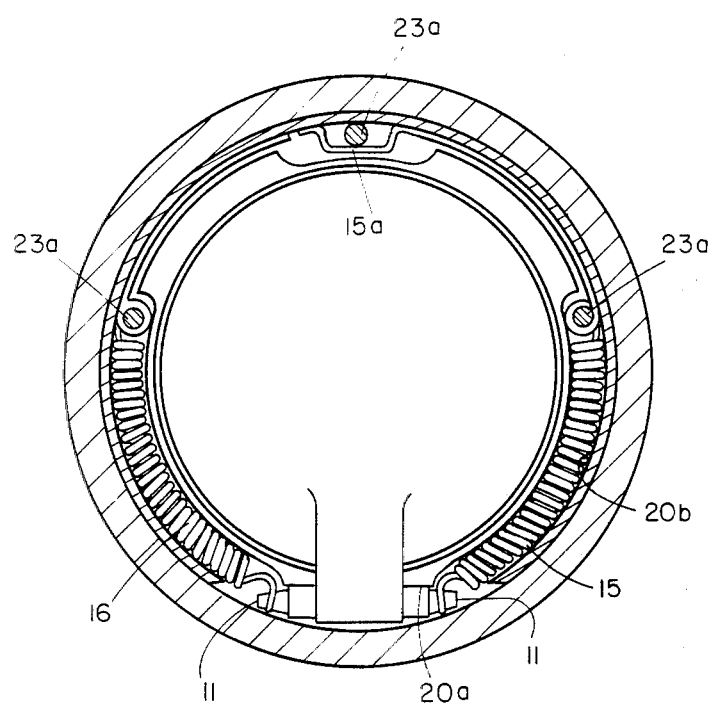
FIG. 4 is a sectional view taken on the plane 4—4 of FIG. 1.

Referring now to FIG. 4, it was previously mentioned that the hinge pins 11 are integrally formed with the body of the flapper 10. The size of hinge pins 11 is less than that of conventional hinge pin assemblies used with conventional assemblies. The integral hinge pins 11 are received within an annular recess 20a. The recess 20a extends annularly around the entire abutting surfaces of the tubular members 21 and 22 and provides space for mounting a pair of helical torsion springs 15 and 16, which extend circumferentially around a portion of the valve housing.

Each spring has one end thereof inserted in a transverse aperture (not shown) provided in one integral hinge pin 11. The other ends of the springs 15 and 16 are first wrapped around the axially extending alignment pins 23a, which are mounted between the tubular members 20 and 21 and valve seat sleeve 23, and the ends extend around the remainder of the annular recess 20a. The one spring 15 may be provided with a radially inwardly bent portion 15a to extend around a locating pin 23a. This prevents inadvertent reverse assembly of springs 15 and 16. In any event it will be apparent to those skilled in the art that the helical springs 15 and 16 are in torsion relative to the flapper 10 so that the pivotal movement of flapper 10 from its horizontal closed position shown in FIG. 1 to its vertical open position shown in FIG. 2 is opposed by a spring bias produced by the torsionally winding of the helical springs 15 and 16. Thus, the flapper 10 is normally biased to its closed position shown in FIG. 1 and will return to such position whenever permitted by the upward withdrawal of the actuating sleeve 30.

As it is known to those skilled in the art, the flapper 10 may be moved to its open position by providing the actuating sleeve 30 with an end face of generally radial configuration. In accordance with this invention, the end face 30a of the actuating sleeve 30 is preferably arcuately formed as viewed in a vertical plane so as to initially contact the inner portions of the annular cylindrical seating surface 12 of flapper 10 at a position which is just slightly radially spaced beyond the axis of the conduit 1 relative to the axis of the hinge pins 11. The resultant force exerted on the flapper 10 by fluid pressure existing below the flapper valve normally acts on the flapper 10 at a position corresponding to the axis of the conduit.

Figure 5:
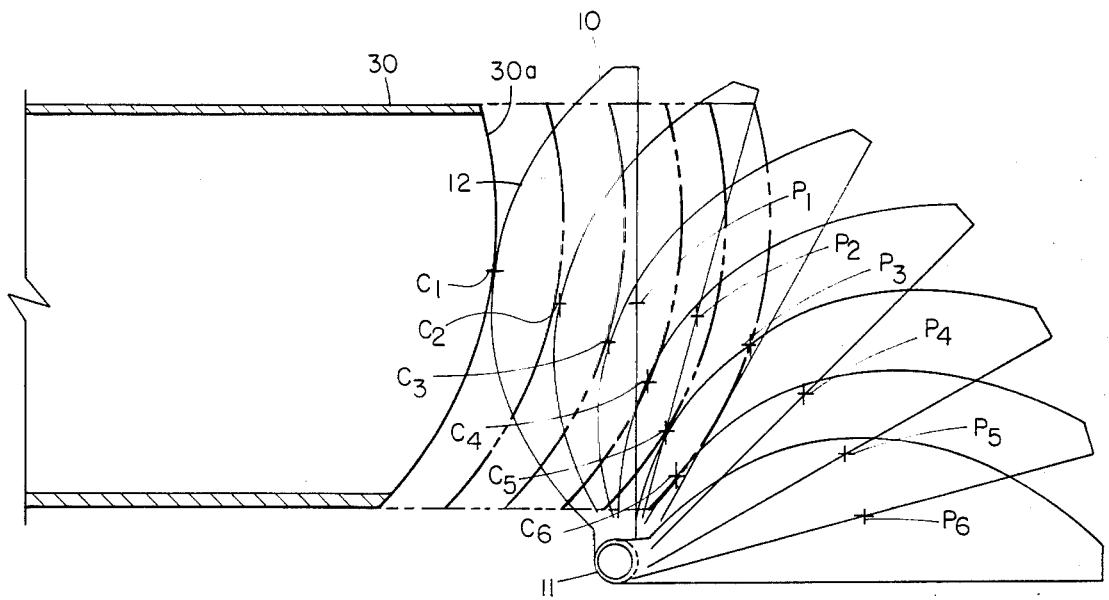
FIG. 5 is a schematic view illustrating the locii of forces operable on the flapper valve.

The radial position of such points are clearly indicated by the geometric drawing of FIG. 5, wherein the successive points C1, C2 . . . C6, indicate the locus of the path of contact of the curved bottom surface 30a of the actuating sleeve 30 with the inner portion of the upwardly facing annular seating surface 12 of the flapper 10. These points represent the effective point of application of downward force to the flapper 10 by the actuating sleeve 30. Similarly, the points P1, P2 . . . P6 represent the effective point of application of the resultant fluid pressure forces exerted in an upward direction on the flapper 10 as it moves from its horizontal closed position to its substantially vertical open position. Point C1 in turn corresponds to point P1. Similarly points 2 through 6 correspond.

It will be noted that the radial distance from the axis of the pivot pins 11 to the initial contact point C, is slightly greater than, but roughly equal to, the radial distance from the axis of hinge pins 11 to the point P1 of application of the resultant fluid pressure force. Thus, the downward force on the actuating sleeve 33 need only be approximately equal to the upward pressure force on the flapper 10 and flapper 10 when the flapper valve begins to open. In the preferred embodiment depicted herein, the radius of the contact points C1, C2 . . . C6 are progressively closer to the axis of hinge pins 11 than the locus of the point P1, P2 . . . P6 representing the location of the resultant fluid pressure force. Thus, the forces on the flapper 10 produced by the downward force exerted by actuating sleeve 30 in opposition to the upward fluid pressure forces will initially exert only a slight moment on the flapper 10, thus minimizing the twisting force exerted on the hinge pins 11 and permitting such pins to be of a substantially smaller diameter, on the order of 50 percent of the hinge pin diameter normally provided for the same size, conventional flapper valve. Moreover, as the opening movement of the flapper 10 progresses, the moment arm of the fluid pressure forces represented by these points P1, P2 . . . P6 remains approximately equal to the moment arm of the opening forces represented by points C1, C2 . . . C6 because the fluid pressure force is always upwardly directed and only a slight component of such force will actually be efectively operating on the partially open flapper valve. Therefore, no significant resultant torque is applied to the hinge pins.

Actuating sleeve 30 must, of course, be suitably keyed to the tubular housing 20 to maintain the curved bottom contact surface 30a in the desired angular relation to the flapper 10 throughout the downward movement of sleeve 30.

From the foregoing description, it is apparent that the described construction permits the absolute minimization of the space required for effecting the pivotal mounting of the flapper 10 and the imposition of a torsional bias to such flapper. Moreover, the substantial balancing of the contact forces exerted by the actuating sleeve 30 and effective moment arms with the resultant fluid pressure forces operating on the upstream face of the flapper valve 10 effects a minimum application of unbalanced torque to the flapper valve which must be absorbed by the pivot pins, thus permitting the diameter of such pivot pins to be significantly smaller than the pin diameters previously employed. Lastly, the fabrication of the pivot pins 11 as an integral part of the body of the flapper 10 inherently results in a stronger construction than the separate pins heretofore employed.

It will be understood by those skilled in the art that both a curved flow tube and a curved flapper are not essentially related to the position of the spring utilized herein. The spring can be employed with a more conventional flow tube and flapper valve configuration. Furthermore, the curved flapper valve configuration, and annular torsion spring, can be employed with a flow tube having a flat end and still achieve a significant increase in flow area.

Although the invention has been described in terms of specified embodiments which are set forth in detail, it should be understood that this is by illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed and desired to be secured by Letters Patent is:

1. In a valve for use in controlling flow in a fluid transmission conduit in a subterranean well: a valve flapper rotatable between open and closed positions for controlling the flow in the fluid transmission conduit; the valve flapper having the configuration of a transverse section of an annular cylindrical member defined by an intersecting cylindrical surface having an axis perpendicular to the axis of the cylindrical member; a flapper hinge about which the valve flapper rotates; a valve seat to hold pressure exerted on the upstream valve flapper face in the closed position; an axially reciprocal tubular actuating member having an annular end face abutting the downstream face of the valve flapper upon movement of the actuating member in the upstream direction to exert a resultant upstream force on the valve flapper for opening the valve flapper; and contoured surface means on said annular end face of the actuating member and on the downstream valve face for establishing, during rotation of the valve flapper to open position, changing contact points between said end face of the actuating member and the downstream valve face through which the upstream force exerted by the actuating member on the valve flapper remains in close radial alignment with the resultant pressure force exerted on the valve flapper during initial rotation of the valve flapper about the flapper hinge between the closed and open positions, whereby the couple created by the oppositely directed upstream force exerted by the actuating member on the valve flapper and by the resultant pressure force is minimized to reduce bending and shear on the flapper hinge.

2. The valve of claim 1 wherein the radial separation of the resultant pressure force on the valve flapper from the flapper hinge is less than the radial separation of the upstream force exerted by the actuating member on the valve flapper from the flapper hinge.

3. The valve of claim 1 wherein said contoured surface means on the actuating member and the downstream valve face comprise arcuate surfaces respectively formed on said annular end face and said downstream valve face.

4. The valve of claim 3 further comprising means for maintaining angular alignment between the tubular actuating member and the valve flapper about the axis of the fluid transmission conduit.

5. The valve of claim 4 wherein the axis of said annular cylindrical segment from which the valve flapper is formed is parallel to the fluid transmission conduit axis when the valve flapper is fully open.

6. The valve of claim 1 wherein said flapper hinge comprises a pair of co-axial integral hinge pins formed on said valve flapper.

7. The valve of claim 6 further comprising torsion spring means connected to said hinge pins to bias said valve flapper to its said closed position.

8. A valve for use in controlling flow in a fluid transmission conduit in a subterranean well, comprising: a valve flapper rotatable to open and close the bore of the fluid transmission conduit; a hinge on the valve flapper about which the valve flapper rotates; a valve housing; and a torsionally loaded spring engaging the valve flapper and extending circumferentially around at least a portion of the bore of the fluid transmission conduit and attached to the valve housing, the spring being loaded in torsion as the valve flapper rotates from the closed to the open position to exert a restoring force for rotating the valve flapper to the closed position.

9. In a valve for use in controlling flow in a fluid transmission conduit in a subterranean well: a valve housing having a bore therethrough; a valve flapper, means defining a hinge about which said valve flapper is rotatable between open and closed positions for controlling the flow in the fluid transmission conduit; the valve flapper having the configuration of a transverse section of an annular cylindrical member defined by an intersecting cylindrical surface having an axis perpendicular to the axis of the cylindrical member; a valve seat cooperating with the periphery of the valve flapper to hold pressure exerted on the upstream valve flapper face when the valve flapper is closed; an axially shiftable tubular actuating member engaging the periphery of the valve flapper to rotatably shift the valve actuating member from a closed to an open position; and a torsionally loaded spring engaging the valve flapper and extending circumferentially around at least a portion of the bore of the fluid transmission conduit and attached to the valve housing, the spring being loaded in torsion as the valve flapper rotates from the closed to the open position to exert a restoring force for rotating the valve flapper to the closed position, whereby the valve flapper configuration conforms to the exterior of the tubular actuating member when the valve flapper is open to increase the effective size of the valve housing bore relative to the outer diameter of the valve housing.

10. A valve for use in controlling flow in a fluid transmission conduit in a subterranean well, comprising:
a valve flapper rotatable between open and closed positions for controlling the flow in the fluid transmission conduit;
said valve flapper having a pair of co-axial hinge pins affixed thereto and defining the axis of rotation about which the valve flapper rotates;
valve housing means surrounding the actuating means and the valve flapper and including a downstream housing member with seat means for engaging the valve flapper in the closed position and an upstream housing member;
the upstream and downstream housing members being in abutting relationship with a recess being defined therebetween, said recess extending peripherally around said valve housing means;
said flapper hinge pins being respectively retained between the upstream and downstream housing members and traversing said recess;
and spring means disposed in said peripheral recess and affixed to said flapper hinge pins;
said spring means being loaded in torsion as the valve flapper rotates from the closed to the open position to exert a restoring force for rotating the valve flapper to the closed position.

11. The valve of claim 10 wherein said spring means comprises a pair of coil springs each having one end secured to one of said hinge pins, rotation of said valve flapper about said axis of rotation to open said flapper loading said springs in torsion.

12. The valve of claim 11 wherein said hinge pins are integral with said valve flapper.

13. The valve of claim 10 wherein said hinge pins are integral with said valve flapper.

14. The valve of claim 10 wherein said valve flapper has the configuration of a segment of an annular cylindrical member cut by a cylindrical surface having an axis perpendicular to the axis of the annular cylindrical member.

* * * * *